United States Patent

[11] 3,610,506

| [72] | Inventor | Peter T. Robinson<br>Scottsdale, Ariz. |
|---|---|---|
| [21] | Appl. No. | 832,324 |
| [22] | Filed | June 11, 1969 |
| [45] | Patented | Oct. 5, 1971 |
| [73] | Assignee | Motorola, Inc.<br>Franklin Park, Ill. |

[54] METHOD FOR ULTRASONICALLY WELDING USING A VARYING WELDING FORCE
5 Claims, 4 Drawing Figs.

[52] U.S. Cl. ..................................... 228/1,
29/470.1, 156/73
[51] Int. Cl. ..................................... B23k 1/06,
B23k 5/20
[50] Field of Search........................... 228/1, 3, 4;
29/470, 470.1, 470.3, 470.5, 497.5, 591; 156/73

[56] References Cited
UNITED STATES PATENTS

| 3,002,270 | 10/1961 | De Prisco ............... | 29/497.5 |
|---|---|---|---|
| 3,056,192 | 10/1962 | Jones ....................... | 228/1 |
| 3,087,239 | 4/1963 | Clagett ..................... | 29/497.5 |
| 3,235,945 | 2/1966 | Hall .......................... | 29/470.1 |
| 3,250,452 | 5/1966 | Angelucci ................ | 228/3 |
| 3,289,452 | 12/1966 | Kollner..................... | 29/470.1 |
| 3,357,090 | 12/1967 | Tiffany..................... | 29/417.5 |
| 3,397,451 | 8/1968 | Avedissian ............... | 228/3 |
| 3,380,150 | 4/1968 | Daniels..................... | 228/1 |
| 3,430,835 | 3/1969 | Grable et al. ............. | 29/591 |
| 3,472,443 | 10/1969 | Holzl........................ | 228/3 |

*Primary Examiner*—John F. Campbell
*Assistant Examiner*—Donald P. Rooney
*Attorney*—Mueller and Aichele ABSTRACT: An improvement in ultrasonic welding is effected by progressively increasing the welding force and then applying the ultrasonic energy so that a portion of the ultrasonic welding period occurs during the welding force range when optimum ultrasonic welding conditions exist; an ideal welding force, for this application being defined as the force applied to the parts to be joined by a welding tip or other means of applying ultrasonic energy, so that the faces to be welded are pressed together at the intended location of the weld.

INVENTOR.
Peter T. Robinson

METHOD FOR ULTRASONICALLY WELDING USING A VARYING WELDING FORCE

BACKGROUND OF THE INVENTION

This invention pertains to the field or art of welding wherein pressure and ultrasonic energy are utilized in the joining of metals. The application is directed both to the method and to the apparatus being used.

Referring now to the prior art, ultrasonic bonding or welding has been used for sometime and has particular application in the semiconductor industry where small wires or thin sections of material are joined routinely both to metals and semiconductor materials. Generally, ultrasonic bonding differs from thermal compression bonding which is widely used in the semiconductor industry in that the amount of deformation occurring at and near the point of the bond is typically considerably less with the ultrasonic methods than with the thermal compression methods so that a much stronger system or weldment results as a result of the comparatively minimal deformation occurring in ultrasonic bonding. Both methods have fundamental similarities, however, in that energy is supplied (by heating or by vibration) and pressure is necessary at the faces to be welded to complete and strengthen the bond. The force supplying the pressure is the welding force.

In ultrasonic bonding, vibratory energy is available either at a fixed frequency or at a varying frequency (in amplitude and/or cycles per second) but in either case an optimum range of welding force will exist which provides maximum bond strength on the average for wires or metal sections of a particular thickness cleanliness, composition, elongation, tensile strength, stress relief and other factors in the materials being bonded together. In the typical case of fixed force ultrasonic welding some compromise with ideal conditions always occurs in that a welding force that permits maximum scrubbing of the faces to be welded and the consequent disruption of, for example, surface oxides and other weld inhibitors is not necessarily the ideal welding force for completing the weld. The basic problem is that it is always very difficult to establish or identify and set up an ideal force due to the variations in these so-called welding constants. Typically, a somewhat lighter welding force is desirable during the initial scrubbing phase of the ultrasonic welding cycle as a somewhat greater amplitude of relative vibration of the faces occurs which is desirable at this point than near the end of the weld where a small or even zero amplitude may be all that is required. In the past, method and apparatus for providing such a welding sequence have not been available to the art.

It should be noted that the need for the use of the ideal clamping force or welding force becomes much more desirable as the parts to be welded become thinner and especially smaller in section as is typically the case with nearly microscopic parts frequently welded in the semiconductor industry. The reason for this is clear, when one realizes that the tolerances that are typically held on very small parts, wires, for example, are much looser percentagewise than would be tolerances typically held on wires 10 or a hundred times the diameter As in any production process it is desirable to avoid paying premium prices for wire and other components held to extremely fine tolerances especially where possible to devise new production methods and equipment, especially simple production equipment, which will provide completely adequate welds with much less attention to tolerances to include dimensional and those other factors as previously noted such as the composition, tensile strength, etc. The applicant's invention is directed to an improvement over the art in that it provides both a method and an apparatus which mechanically discounts in a very simple manner the effect of most of the variables affecting the welding force requirements so that (1) under otherwise equivalent conditions, welds are formed that on the average are stronger than those made using conventional ultrasonic welders, and (2) exceptionally strong welds are almost invariably attained.

SUMMARY OF THE INVENTION

Briefly summarized, the applicant's invention is a method wherein parts to be ultrasonically bonded undergo an excursion through a range of welding force during which ultrasonic energy is applied to the ultrasonic welding tip. Also, the present invention provides an ultrasonic bonding machine head which provides a simple means for implementing the method of the invention. The head consists of, in addition to the usual components, an air cylinder which is fastened so as to apply a varying force at the point of weld via the transducer coupler portion of the ultrasonic bonding machine and a means for turning on the ultrasonic vibratory energy when a given force is reached.

DESCRIPTION OF PREFERRED EMBODIMENT

Figure 1:
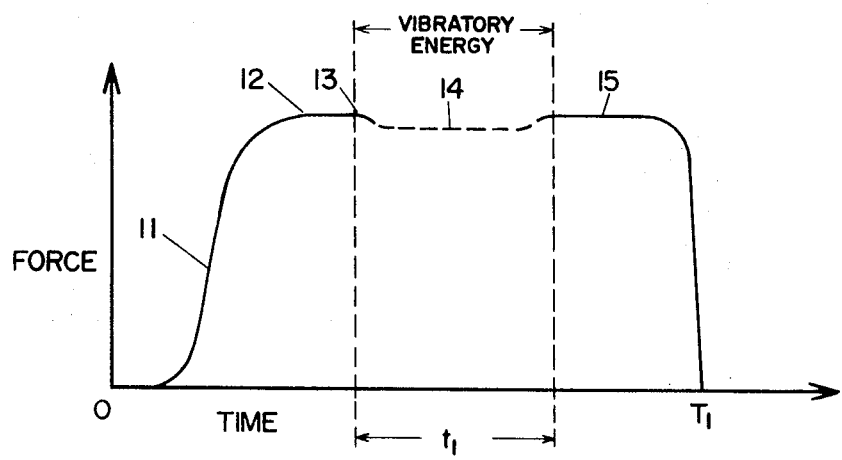
FIG. 1 is a force versus time diagram of the conventional ultrasonic bonding method as used with a typical ultrasonic bonding machine.

In the force versus time diagram illustrating the conventional ultrasonic welding method and shown in FIG. 1, the ultrasonic welding cycle begins at zero and is concluded at time $T_1$. The welding force is applied at zero and rises rapidly along the portion of the curve shown as 11, peaks at point 12, then at 13 the ultrasonic generator is turned on (vibratory energy) and the force 14 falls slightly as the parts being welded are somewhat thinned out during the portion of the time when the vibratory energy is applied. The force then rises at 15 to about the same peak force as 13 at the termination of the vibratory energy period in the cycle. The force is then usually held for a short period of time and then is completed when the force as before drops to zero at $T_1$. Note that the portion of the curve 14 is shown dashed. This is to denote an average value. In practice, the actual welding force is quite difficult to measure accurately with the ultrasonic vibratory energy applied. However, during the period while vibratory energy is applied, the effective welding force is necessarily of a lower average due to the inertia of the vibrating parts of the welding machine and the piece parts being welded together while at the same time the thickness of the material is being reduced somewhat. This takes place in an extremely short time, typically milliseconds, where very small parts are being welded.

Figure 2:
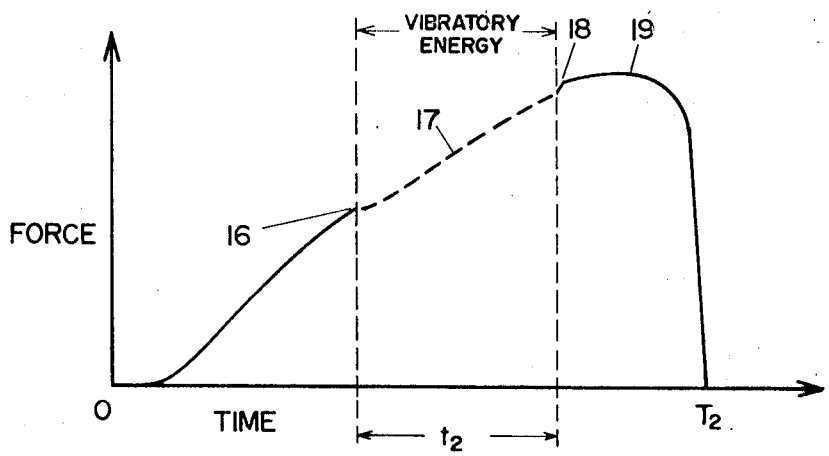
FIG. 2 is a force versus time diagram illustrating graphically the method of this invention.

The force versus time diagram of FIG. 2 illustrates the method of the applicant's invention. The welding cycle begins at zero in FIG. 2. The force rises much less quickly than in FIG. 1 to a value 16 where the vibratory energy is applied. At point 16, the welding force is again somewhat diminished for essentially the same reasons given in the explanation of FIG. 1. However, during the interval $T_2$ when the vibratory energy starts and at point 18 when it is concluded, the average value of the welding force with time is made to continue to rise to the termination of the welding cycle where a peak value is reached at 19. At the conclusion of the welding cycle, the welding force drops to a zero as shown. During the time interval $T_2$, it is to be noted that if a range of optimum force lies along the portion of the curve 16 to 18 then at least for a portion of the time during which vibratory energy is applied, optimum welding conditions are experienced by the system. This is demonstrated in practice by the face that the strength of bonds made according to the method of FIG. 2 are greater than those made by the method of FIG. 1. The average weld strength as measured by pull tests perpendicular to the surface of the bonds show a higher average strength for the method of FIG. 2 performed under otherwise equivalent conditions. Pull test values on welds according to the method of FIG. 2 are typically 25 percent greater than for the method of FIG. 1, in the case of 0.002 inch diameter aluminum wired bonded to 15,000 angstrom thick aluminum metallization on silicon semiconductor material.

Figure 3:
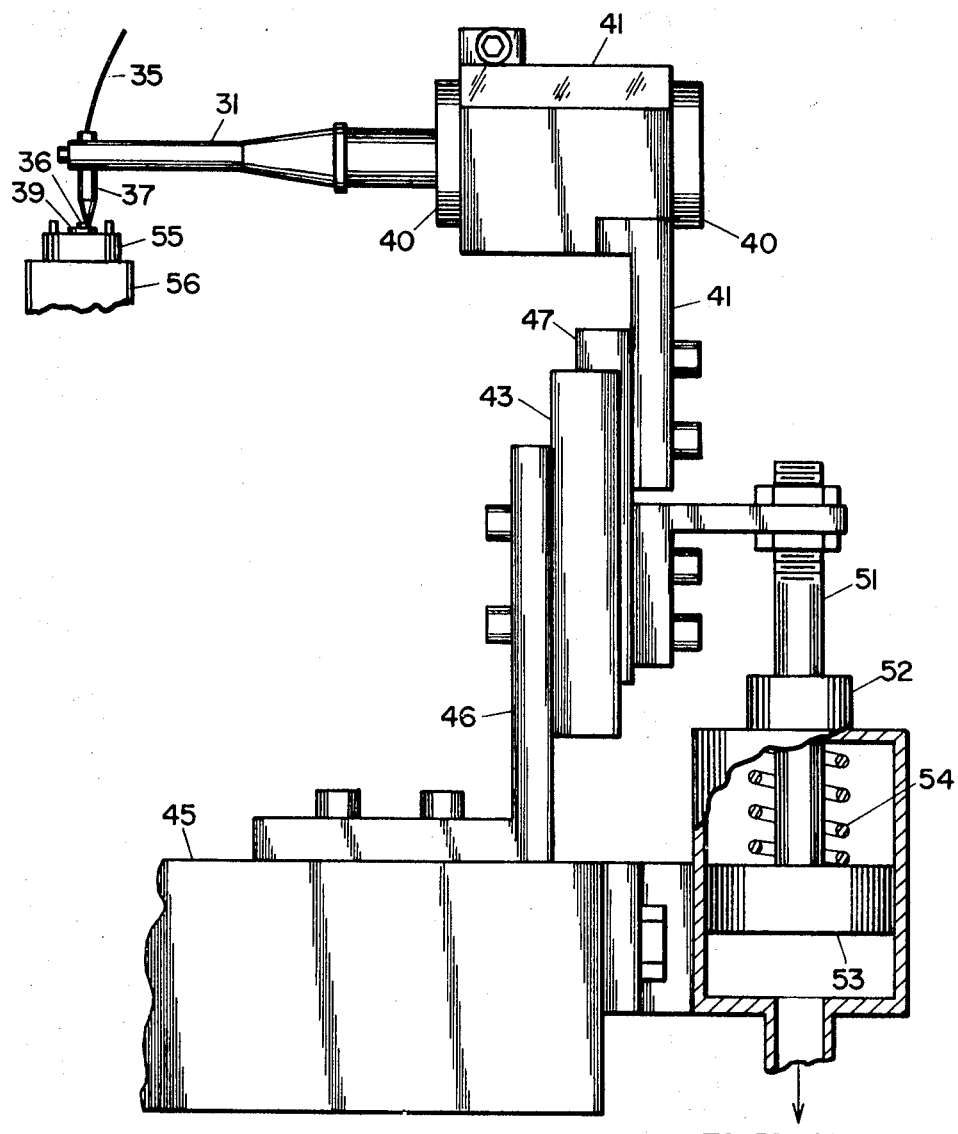
FIG. 3 is a greatly simplified drawing of the basic apparatus described in this invention.
Figure 4:
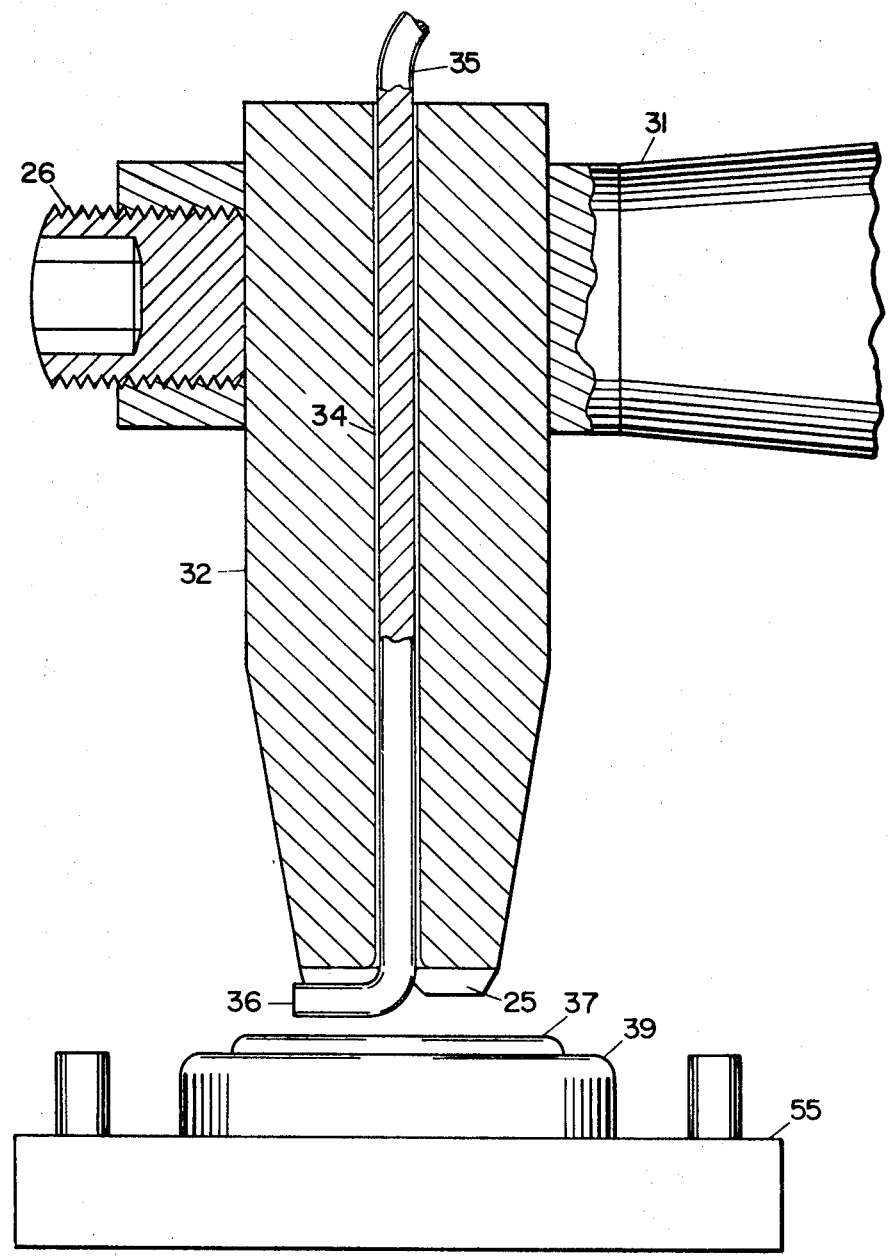
FIG. 4 is an enlarged sectional view illustrating the relationship of the welding tip and parts to be welded.

In FIGS. 3 and 4 are shown an embodiment which is an apparatus consisting of a transducer coupler 31 and with welding tip 32, held with a setscrew 26. The tip is equipped with a full length small hole 34 through which a thin wire 35 is threaded. The end 36 of the wire extends outwardly from tip 32 so that in operation it can contact the metal 37 of a piece of metal coated semiconductor material 39. Wire 35 is shown bent at 90° to the axis of the welding tip. The reel and mechanism to feed the wire 35 are not shown.

At the bottom of the welding tip a small groove 25 of approximately the diameter of the wire and about half its thickness has been machined perpendicularly to the length of the welding tip. This groove contacts the small hole 34 and provides a channel for the bent end of the wire or tip and limits the amount and the extend of distortion which may occur to the wire. Welding tips of this type are well known to the art having been in use for many years. Vibration to the end of the wire in the groove of the ultrasonic welding tip 32 is provided by the ultrasonic transducer 40 of FIG. 3 and transferred via the coupler 31 which is of a tuned shape so that a maximum of ultrasonic energy may be transferred to the welding tip 32.

Applicant wishes to point out that while the head shown in FIG. 3 and especially the welding tip structure being described and is mounting are particularly well suited for a scrubbing action in which maximum components of motion of the applied vibratory energy are perpendicular to the direction to which the welding force is applied and typically parallel to the faces to be welded, considerable work by the applicant has shown that in the case of very fine wires, i.e., 0.001 inches or less in diameter, better welds, in the sense that they are stronger and typically have less distortion, are formed when the transducer-coupler-tip system is so arranged that the major components of the motion of vibration are parallel to the direction to the applied force and perpendicular to the faces of the materials to be welded.

The transducer 40 of FIG. 3 is clamped within a housing which is mounted on a slide 43 and 47 which permits gross up and down motion. The fixed part of the slide 43 is fastened to the base 45 of the bonding machine by a large angle bracket 46. On the free moving portion of the slide 47 another angle bracket 49 (not in FIG. 3) is mounted to provide a means of attachment for a threaded piston rod of the air cylinder as shown in the cutaway to indicate the spring loading of the piston within the cylinder 52. The cylinder 52 itself is rigidly attached by bolting to the base 45 of the bonding machine. When air pressure is applied, the piston 53 and piston rod 51 is actuated upward lifting the ultrasonic welding tip 32 so that parts to which wires are to be welded may be positioned. When the air pressure is reduced, the tip is lowered by the force exerted by the spring until the end of the wire rests against or contacts the semiconductor die which in the illustration shown has been previously soldered to a mounting base or header 55 which is typically clamped then to a movable fixture 56. The clamping means and moving means of the fixture 56 are not considered germane to the invention by the applicant and, therefore, for purposes of clarity have not been shown. After the end of the wire 36 rests firmly against the metallized surface of the semiconductor 39, air is allowed to bleed off reducing the air pressure so that the spring 54 progressively increases the force applied to the wire and then when the air pressure reaches a preset point, an air pressure switch (noted but not shown) triggers on the ultrasonic vibration, the switch being connected to an oscillator (not shown) which provides the electrical energy to drive the transducer. After the switch has been triggered, the air pressure is allowed to fall to zero or any intermediate value allowing the spring to apply the increasing welding force. Normally, the pressure is bled off in such a manner that the vibratory period of the cycle is completed before the spring has applied the maximum welding force to the semiconductor die. In this way, the scrubbing and bonding is caused to occur during a period of rising welding force so that a portion of both the scrubbing and the welding cycle partially occurs under conditions which are more nearly optimum for the constants of the parts being welded.

In the means of applying force there are a variety of alternatives to the spring; for example, a double-acting-type air cylinder may be utilized instead of the single-acting cylinder shown. In the case of the double-acting air cylinder, air pressure is applied to both sides of the cylinder and the welding force is applied by increasing the air pressure to the appropriate side of the air cylinder rather than letting the air pressure bleed off as is the case in the embodiment shown. However, with the particular welding head of the embodiment, better control was obtained by the use of a spring since the spring force proved to be more reproducible than force applied by regulated air pressure.

In the present method as shown in FIG. 2, it is noted that the vibratory energy is applied during a period of increasing welding force and, in most cases, programming the system with the aid of just a simple bleed off to the air cylinder is adequate. However, no such limitation need exist, it being quite possible to apply air or fluid to the cylinder in such a manner as to cause the force versus time curve to vary in a variety of ways should further experimentation show the need for such programming. Obviously, the force may be applied in a variety of ways as well, using such methods as a spring-loaded lead screw or by a spring compressed by a cam or in any of numerous other mechanical ways. Electromagnetically is one way, as, for example, an electromagnet in the form of a solenoid in which the armature is fastened to the angle bracket in a manner of the piston rod of FIG. 3 and varying the current to the solenoid would vary the force applied to the welding tip. As previously pointed out, springs, but not necessarily coil springs, are especially well suited for applying force due to their more constant values, when at a given shape within their useful limits.

The specification has been written with reference to applications closely related to the semiconductor industry. It should be noted, however, that applicant's invention is not so limited and may be utilized in other fields.

The claims are as follows:

1. A method for ultrasonically welding parts together which comprises the following steps:
   a. placing the parts to be welded in contact, said parts being in contact at the location of the desired weld,
   b. applying a variable welding force to said parts, said welding force varying during a given interval,
   c. supplying vibratory energy to said parts subsequent to the initiation of and during the application of said varying welding force, the combination of the varying of said welding force and the application of said vibratory energy effecting the weld, and thereafter
   d. removing said welding force and discontinuing the supply of vibratory energy to said parts.

2. The method of claim 1 wherein the step of supplying vibratory energy to said parts is substantially completed during an interval of continuously varying welding force.

3. The method of claim 2 wherein the step of applying a variable welding force includes substantially continuously increasing said welding force from initial application to its termination.

4. A method in accordance with claim 1 in which the vibratory energy has maximum components of motion substantially perpendicular to the direction of said varying force.

5. A method in accordance with claim 1 in which the vibratory energy has maximum components of motion in a direction substantially parallel to the direction of said force.